Sept. 25, 1945. N. R. KRAUSE ET AL 2,385,451
FEED CUTTER AND SILO FILLER
Filed May 11, 1942 6 Sheets-Sheet 6

Patented Sept. 25, 1945

2,385,451

UNITED STATES PATENT OFFICE 2,385,451

FEED CUTTER AND SILO FILLER

Norman R. Krause and Charles W. Hansen, Racine, Wis.

Application May 11, 1942, Serial No. 442,506

17 Claims. (Cl. 146—109)

The present invention relates to feed cutters and silo fillers. Apparatus of this type, as is well known in the art, usually includes a combined cutter and blower mechanism which, when used in conjunction with suitable means for feeding the corn or other crop which is to be cut into the cutting mechanism, is operable to deliver the cut crop to the interior of a silo.

The principal object of the invention is to provide an improved device of this type, and, as will hereinafter appear, this object is accomplished through the provision of various structural combinations and improvements in the apparatus under consideration. The various features of the invention will be made apparent by reference to the accompanying drawings, and the following description of certain preferred embodiments thereof.

Figure 2:
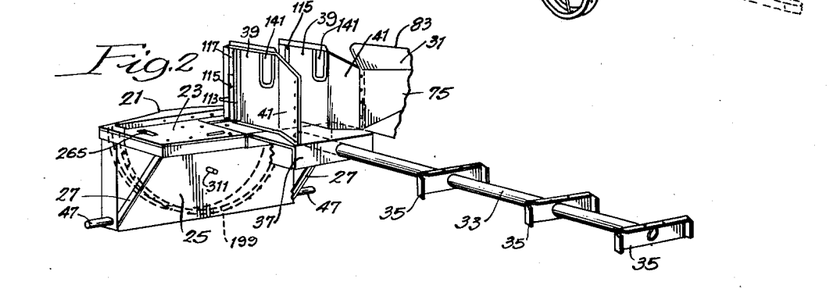
Fig. 2 is a perspective view of the unitary main frame and lower fan housing forming a part of the apparatus illustrated in Fig. 1.
Figure 3:
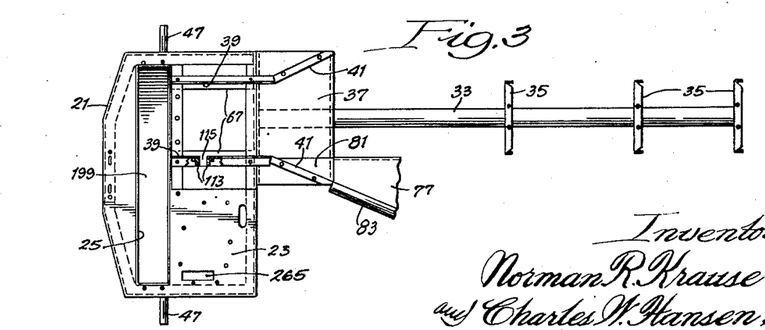
Fig. 3 is a plan view of the frame and housing illustrated in Fig. 2.

The details of the main frame 21 for the cutter wheel and blower assembly of the machine are illustrated particularly in Figs. 2, and 3. As shown in those figures, this frame includes a plurality of integrally welded, metallic, plate, angle, and channel sections which define a horizontal portion 23 and the sides 25 of the lower half of the blower housing. Struts 27 connect the horizontal portion 23 of the frame and the lower ends of the blower housing 25 to give increased rigidity. The various parts of the frame 21 are provided with suitable openings for the blower and cutter mechanisms, the crop carrier and feeder means, and the driving mechanism, as will hereinafter appear.

The crop carrier and feeding means includes an endless conveyor or carrier raddle 29 and a sheet metal hopper 31 of suitable design. The carrier raddle 29 and the hopper 31 are supported on a tubular frame which is illustrated particularly in Fig. 2, and which includes a longitudinally extending, metallic tube 33, transversely extending angle members 35, and a large channel section 37 which is adapted to be rigidly affixed to the frame 21 for the blower and cutter mechanism. The tube 33 is welded to the large channel section 37 as illustrated particularly in Fig. 6 and that section in turn is bolted or otherwise attached to the adjacent edge of the frame 21. To increase the rigidity of the connection between the frame 21 and the frame for the hopper 31 and the carrier raddle 29, vertical extending plate members 39 of moderately heavy sheet metal having outwardly flaring side portions 41 which connect with, and constitute an extension of, the hopper 31 are securely bolted to the channel portion 37 of the carrier and hopper frame and to the horizontal portion 23 of the main frame 21. The result of the combination of structural features thus described is to provide a frame of relatively light weight, but of great strength and rigidity.

Figure 1:
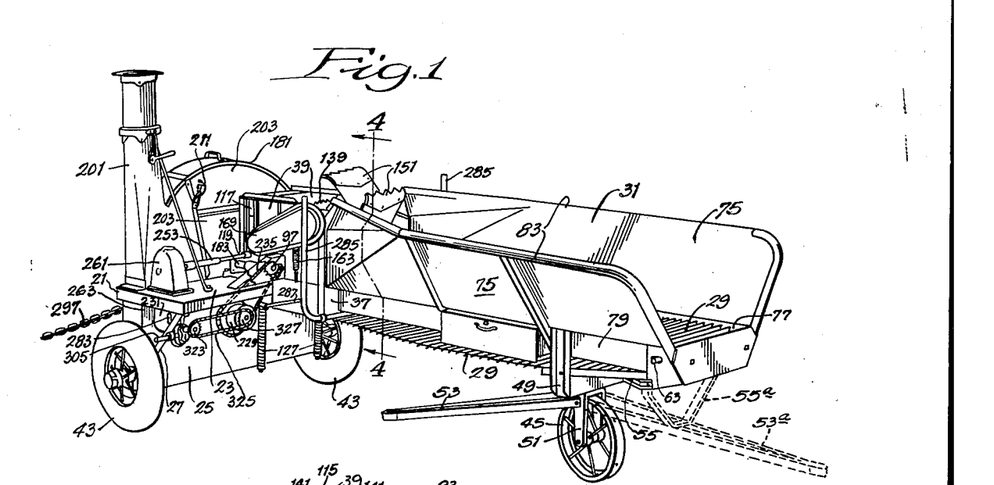
Fig. 1 is a perspective view of a feed or crop cutter embodying the features of the present invention.

The complete machine is supported on the ground by means of a tricycle supporting mechanism which embodies a number of novel and useful features. This mechanism includes the two rear wheels 43 which carry the main weight of the machine and a single front wheel 45. The two rear wheels 43 are rotatably supported upon the main frame 21 for the cutter and blower mechanism by means of a pair of spindles 47 and suitable bearings (not shown). As illustrated in Fig. 1, the front wheel 45 is supported directly below the front end of the machine by means of a yoke 49 rigidly attached to the ends of one of the transverse angle members 35 forming a part of the carrier frame, a fork 51, and a vertical bearing connection (not shown) intermediate the yoke and fork which permits the wheel 45 to be turned. A draw bar 53 is pivotally attached to the wheel fork 51 as shown.

When it is desired to transport the machine over any substantial distance the draw bar 53 is moved to the position shown by the dotted lines 53a in Fig. 1 and the U shaped, draw bar locking member 55, which is pivotally supported on the frame of the machine, is lowered into place as shown by the dotted line 55a in Fig. 1 and fastened to the draw bar 53. It is then possible by lifting the draw bar 53 to raise the front end of the machine so that only the rear wheels 43 contact the ground or road surface. This makes possible the convenient transport of the complete machine at relatively high speeds by the use of only two rubber tires, which is an important consideration. At the same time the tricycle arrangement permits the machine to be moved over short distances by the use of all three wheels, the draw bar locking member 55 being left in the upper position, as shown in full in Fig. 1, in such instances.

The draw bar 53 and third wheel 45 accomplish another useful function in that during the normal use of the machine they can be turned to one side and staked down, thereby aiding in holding the machine stationary and balancing the belt pull. In certain instances, it may be desirable to change the location of the rear wheels to the position shown in Fig. 18. This has the effect of partially balancing the machine over the rear axis of the wheels and greatly reduces the weight on the draw bar during transport. It has the additional advantage of moving the rear wheels more completely out of the path of the belt, thus making for greater freedom in the location of the driving unit.

Figure 4:
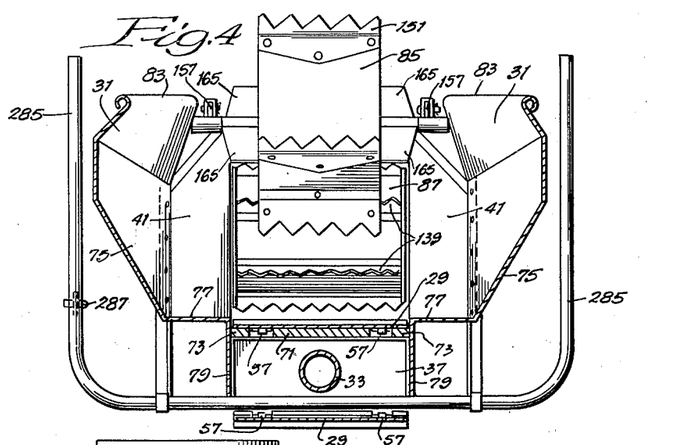
Fig. 4 is a fragmentary sectional view on the general line 4—4 of Fig. 1.
Figure 5:
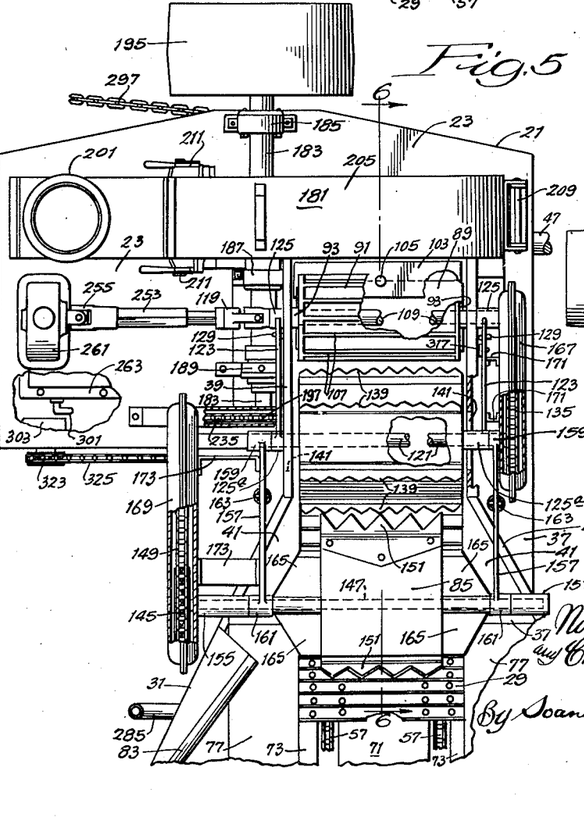
Fig. 5 is a fragmentary plan view of the cutter which is illustrated more completely in Fig. 1.
Figures 6, 14:
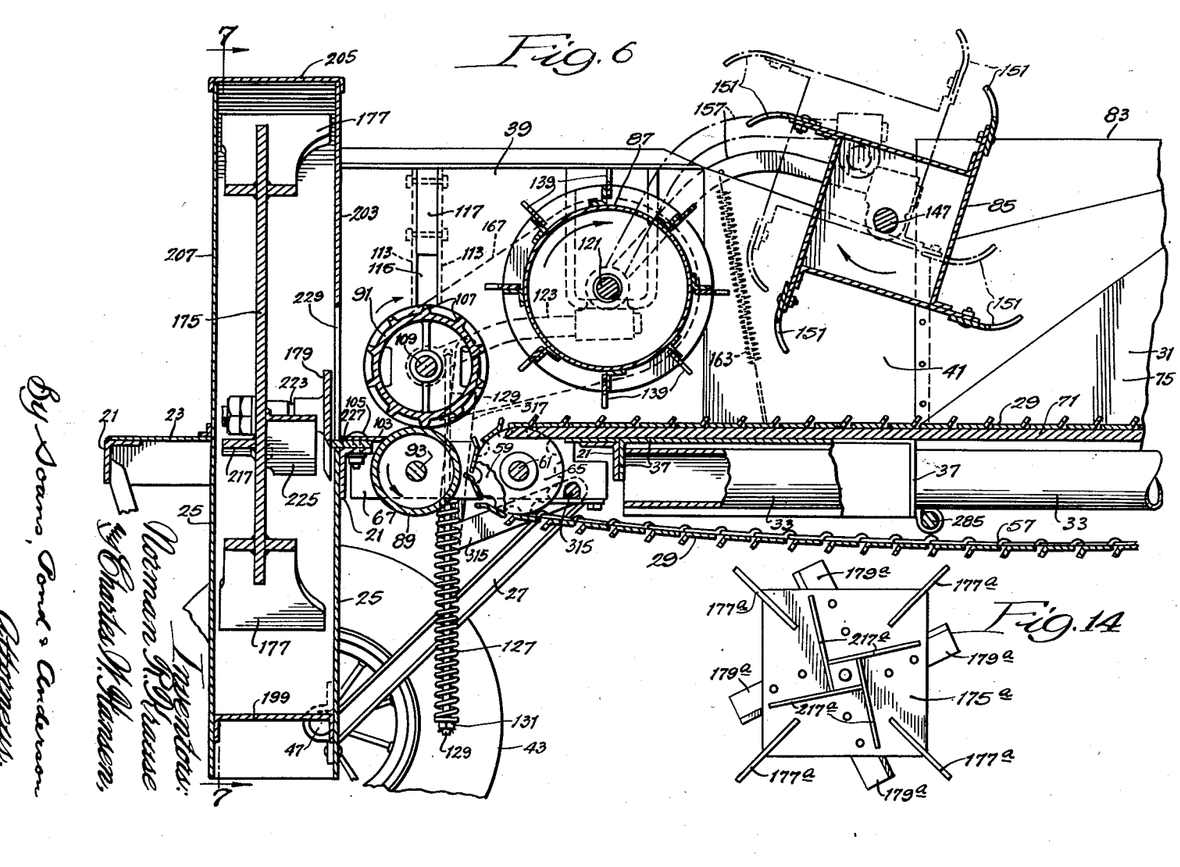
Fig. 6 is a sectional view on the general line 6—6 of Fig. 5.
Fig. 14 is an elevational view of a modified cutter wheel and blower assembly including certain features of the present invention.

The carrier raddle 29 is of the closed slatted type, and the individual slats of the carrier are held in position and moved by means of two continuous chains 57, as shown particularly in Fig. 5, and Fig. 6. The chains 57 engage suitable, supporting, sprocket wheels 59 which are integrally attached to shafts 61 and 63, located at either end of the machine. To give further support to the carrier slats adjacent the sprocket shafts, supporting discs 65 of suitable dimensions may be provided intermediate the sprocket wheels, as illustrated particularly in Fig. 6, and Fig. 16. The sprocket shafts 61 and 63 are rotatably supported in suitable bearings provided in the hardwood bearing blocks 67 and 67a. The shaft 63 is adjustable so as to control the tautness of the carrier chain. The upper run of the carrier is supported along the length of the hopper 31 by means of suitable, longitudinally extending boards 71 and 73 which are illustrated particularly in Figs. 4 and 6. The boards 71 and 73 overlie and are attached to the transverse extending frame members 35 and 37.

The hopper 31 is a reinforced sheet metal structure having downwardly extending side portions 75 which merge into horizontal portions 77 disposed at substantially the same lever as the carrier 29. These horizontal portions 77 cause the hopper 31 to have a substantially greater width than the width of the carrier. For the purpose of strengthening the structure the sides of the hopper are extended downwardly as shown at 79. The bottom of the hopper structure is rigidly attached to the frame cross members 35 and 37 and the upper and front edge of the hopper is provided with a rolled reinforcing section 83. The rear end of the hopper 31 tapers inwardly and is attached to the outwardly flaring portion 41 of the plate members 39, as shown particularly in Figs. 4 and 6, so as to form a continuation thereof. Thus at its inner end the hopper width becomes equal to the width of the carrier.

Figures 9, 10, 11, 12, 13:
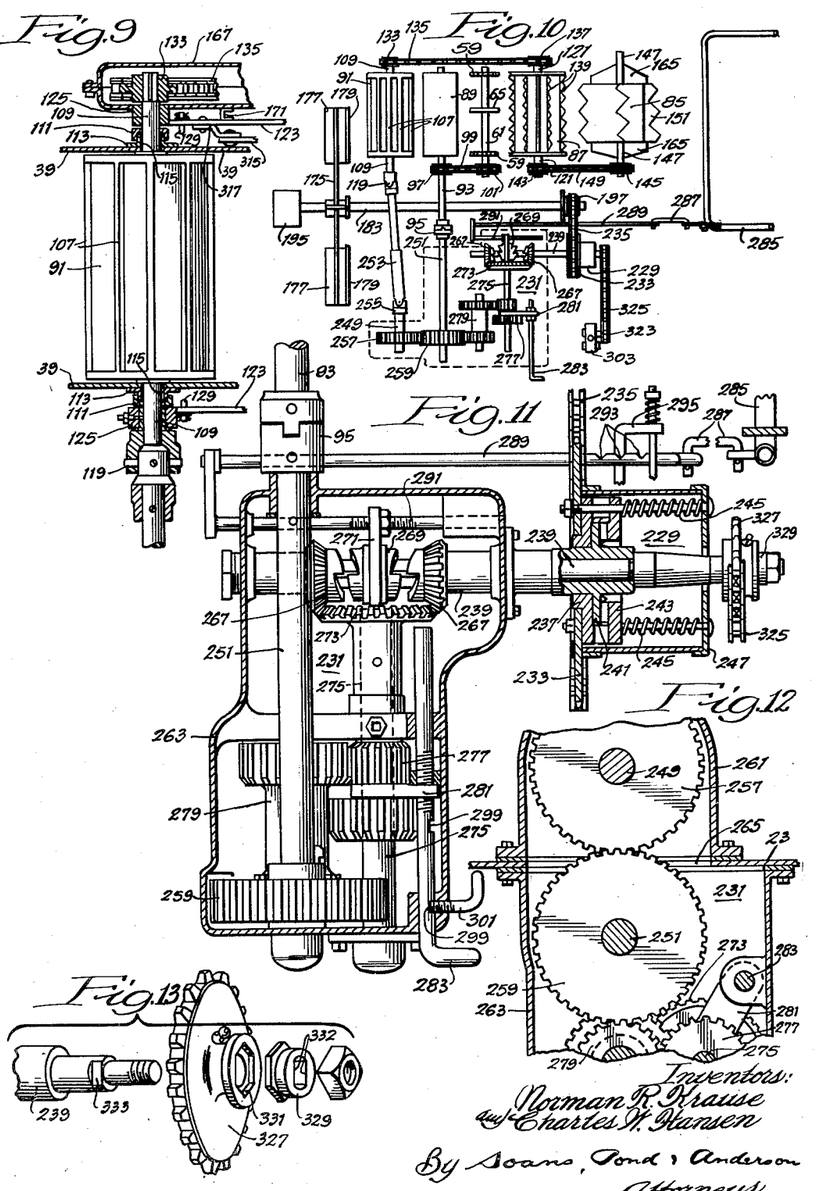
Fig. 9 is a fragmentary view, partially in section, illustrating certain of the details of the upper feed roller and the associated mechanism forming a part of the machine illustrated in Fig. 1.
Fig. 10 is a diagrammatic elevational view showing certain of the moving parts of the machine and the control means therefor.
Fig. 11 is a plan view, partially in section, of the gear assembly and the safety jump clutch embodied in the machine.
Fig. 12 is a fragmentary view showing portions of the upper and lower gear box and the gearing contained therein.
Fig. 13 is a perspective view of the drive sprocket and declutching mechanism provided at one end of the safety clutch illustrated in Fig. 11.

In addition to the hopper 31 and the carrier 29, the feed mechanism includes, as shown particularly in Figs. 5, 6, and 10, a rotatable beater roll 85, a rotatable intermediate roll 87, and a pair of cooperating, squeeze type, feed rolls 89 and 91. The lower feed roll 89 is smooth surfaced and is supported upon a shaft 93 which is journaled in suitable bearing openings formed in the bearing blocks 67. The bearing blocks 67 are rigidly affixed to the main frame 21 as shown particularly in Fig. 3. The supporting shaft 93 for the lower feed roll 89 is connected to the main driving mechanism of the apparatus through a self aligning coupling 95, as illustrated particularly in Fig. 10. A sprocket wheel 97 is keyed to the shaft 93 and is connected by a chain 99 to a second sprocket 101 keyed to the supporting shaft 61 for the rear end of the carrier 29. Through this arrangement, the lower feed roll 89 and the carrier 29 are operated at the same relative speed.

To prevent accumulation of material on the smooth surfaced lower feed roll 89, the machine includes a scraper plate 103 having a beveled edge for engaging the roll surface. The scraper 103 is bolted to the main frame 21 by suitable spaced bolts 105 as illustrated in Fig. 6. Slotted bolt holes may be provided in the scraper plate 103 to permit convenient adjustment thereof. The upper feed roll 91 is of hollow tubular construction and the periphery of this roll is provided with a plurality of longitudinally extending ribs or flutes 107 which are adapted to grip the material being fed into the cutting mechanism.

To accommodate the differing amounts of material which will be delivered to the machine during normal operation, it is necessary that the feed rolls 89 and 91 shall be movable relative to each other and that the intermediate and beater rolls 87 and 85 shall be vertically movable relative to the bottom of the hopper 31.

In the machine illustrated in the drawings the upper, squeeze type, feed roll 91 is vertically movable relative to the lower feed roll 89. To make possible this movement, the supporting shaft 109 for the upper feed roll is provided with two channel shaped guide members 111 which slidably engage two oppositely arranged angles 113 disposed along either side of the vertical slots 115 provided in the vertical side portions 39 of the frame, as illustrated particularly in Figs. 2 and 9. The upper limit of movement of the feed roll 91 is defined by a stop which may comprise a block of wood 117 bolted into place between the angle members 113, as illustrated in Fig. 6.

The left hand end of the upper feed roll shaft 109 is operatively connected to the drive mechanism through a universal joint 119, as illustrated particularly in Figs. 5, 9 and 10, and both ends of the upper feed roll shaft 109 are mechanically connected to the corresponding ends of the supporting shaft 121 for the intermediate roll 87 by link members 123. The link members 123 rotatably engage the shafts 109 and 121 by means of suitable bearing members 125 and 125a as shown particularly in Figs. 5 and 9. Each of the link members 123 is connected intermediate its ends to a compression spring 127 by means of a suitable tie rod 129 which extends through an opening in the main bearing block 67 at either side of the machine. One end of each spring 127 presses against the adjacent bearing block 67, and the other end is connected to the lower end of the cooperating tie rod 129 by a nut and washer assembly 131 for adjusting the tension on the springs 127. The reaction force of the springs 127 serve to bias the upper feed roll 91 in the direction of the lower feed roll 89 with such pressure as may be required during the operation of the machine. The springs also exert a biasing action on the intermediate feed roll 87, as will be apparent from Fig. 6.

A drive sprocket 133, see Figs. 9 and 10, is provided at the right hand end of the supporting shaft 109 for the upper feed roll 91, and this sprocket is connected by a suitable chain 135 to a sprocket 137 which is keyed to the right hand end of the supporting shaft 121 for the intermediate feed roll 87. Through this means the intermediate feed roll 87 is driven at the same relative peripheral speed as the main feed rolls 89 and 91.

The intermediate feed roll 87 is of fabricated construction, and in general comprises a hollow cylindrical roll body having toothed feeder bars 139 removably attached to the surface thereof. The supporting shaft 121 for this roll is journaled in the bearings 125a which are attached to the links 123. The bearings 125a rest against the lower surface of the openings 141 formed in the side frame members 39 when the apparatus is not in operation. The left hand end of the intermediate feed roll shaft 121 is provided with a sprocket 143, and this sprocket is mechanically connected to a suitable cooperating sprocket 145 keyed to the supporting shaft 147 for the beater roll 85 by a chain 149.

The beater or first feed roll 85 is also of fabricated construction. For best results this roll should be square, as illustrated particularly in Figs. 4 and 6, and it should be provided with toothed extensions 151 which curve opposite to the normal direction of rotation thereof. The beater roll shaft 147 is journaled in bearings 153 and 155 (Fig. 5) which are adapted to rest on the upper surface of the adjacent, underlying flared portions 41 of the vertical frame members 39. The beater roll 85 and the intermediate feed roll 87 are mechanically interconnected similarly to the intermediate roll 87 and the upper squeeze type, feed roll 91 by means of link members 157 which terminate in bearings 159 and 161 journaled respectively on the shaft 121 for the intermediate roll 87 and the shaft 147 for the beater roll. During normal operation of the feeding mechanism, the intermediate feed roll 89 will be held in an elevated position depending upon the thickness of the material being handled. To provide for resilient support of the beater roll 85 and to augment the biasing action of the springs 127 on the intermediate roll 87, the link members 157 are biased downwardly in the direction of the carrier 29 by suitable tension springs 163.

The complete assembly consisting of the upper, squeeze type, feed roll 91, and the intermediate feed roll 87 and the beater roll 85 is movable completely independently of the lower, squeeze type, feeder roll 89. The beater roll 85 is movable independently of the intermediate roll and the upper squeeze roll, and there is some interdependence of movement possible between the upper feeder roll 91 and the intermediate roll 87. However, when the intermediate roll 87 is moved upwardly by a sudden large increase in the amount of material being fed into the machine, the ends of the supporting shaft 121 therefor will be moved into contact with the edges of the opening 141, with the result that a corresponding upward movement of the upper feed roll 91 will be effected. This aids the operation of the machine. When the rate of feeding is reasonably uniform, the two rolls 87 and 91 will maintain substantially the same relative position shown in Fig. 6, and completely independent vertical movement of each roll, to compensate for minor variations in the amount of material being fed, will take place automatically.

It will be noted that the width of the beater roll 85 is not much greater than about one-fourth the maximum width of the hopper 31 and is of substantially less width than the width of the carrier raddle 29. It will also be noted that the beater roll 85 is provided with wings 165, as illustrated particularly in Figs. 4 and 5, of substantially the same angularity as the inwardly converging portion of the hopper defined by the side portions 41 of the plate members 39. This particular construction and arrangement of the beater roll together with the use of an intermediate feed roll and two squeeze type feed rolls accomplishes a much more uniform and much more efficient feeding of the material to be cut than has been obtained by the prior art constructions. The intermediate roll 87 and the two squeeze type feed rolls 89 and 91, it will be noted, are of substantially the same width as the carrier 29.

In the interest of safety, it is desirable that the sprockets and chains used for effecting rotation of the intermediate feed roll 87 and the beater roll 85, shall be enclosed within suitable shields or guards such as are illustrated at 167 and 169. The guards 167 and 169 comprise suitable complementary metal sections which are bolted together, and to give increased rigidity to the structure these shields are in turn mechanically connected to the adjacent links 123 and 157 by brackets 171 and 173, as illustrated in Fig. 5.

Figure 7:
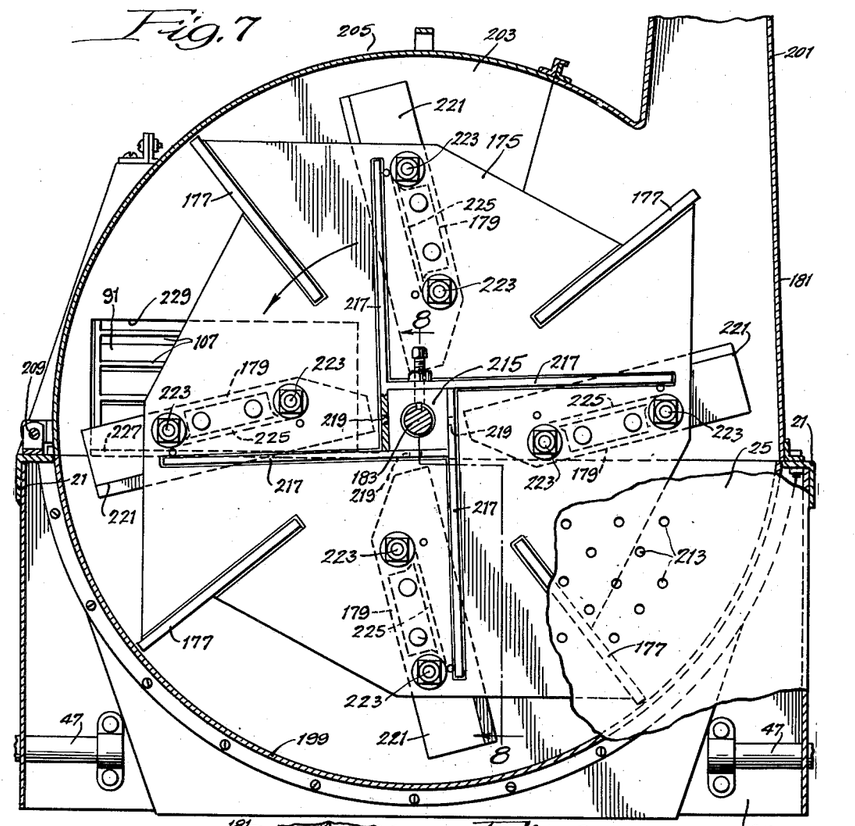
Fig. 7 is a sectional view on the line 7—7 of Fig. 6.
Figure 8:
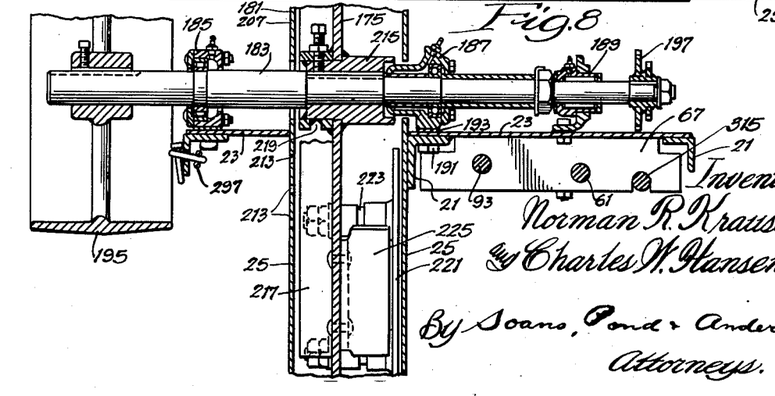
Fig. 8 is a sectional view on the line 8—8 of Fig. 7.

The combination cutter and blower mechanism used in the apparatus includes a rotatable plate member or cutter wheel 175 having the general shape illustrated in Fig. 7, and provided with four, equally spaced vanes 177 and four, equally spaced, adjustable knife assemblies 179. The complete cutter wheel assembly is mounted for rotatable movement within the blower housing 181 by means of a suitable shaft 183 and a centrally located, main, bearing 187 and two bearings 185 and 189. The main or intermediate bearing 187 is adjustably supported upon the central and most rigid portion of the main frame 21 by suitable bolts 191 and shims 193, and each of the two outboard bearings 185 and 189 is similarly supported upon the horizontal portion 23 of the frame 21, as shown particularly in Fig.

8. A drive pulley 185 is keyed to the rear end of the shaft 183 for connection to a tractor or other source of power, and the front end of the shaft 183 is provided with a double element, reversible sprocket 197 which constitutes the main drive sprocket for the other moving parts of the machine.

The blower housing 181 is cylindrical in form and is so designed that a part of the upper half thereof may be opened to permit convenient access to the cutter and blower wheel assembly for adjustment or repair. The lower half of the blower housing is defined by the vertical side portions 25 of the frame 21, together with an arcuate, removable, wrapper 199 which is supported between the side portions 25. The upper portion of the blower housing 181 is of fabricated sheet metal construction, and includes a delivery pipe section 201, which is fixedly attached to the frame 21, and a side portion 203, which is also fixedly mounted on the main frame 21. The other parts of the upper half of the blower housing, including the arcuate wrapper 205 and the rear, side portion 207, are integrally connected to each other and are hingedly supported upon the main frame 21 by a suitable hinge 209. It will be apparent that this hinged part of the blower housing 181 can be readily opened up to permit access to the cutter wheel assembly. During normal operation of the machine, the hinged part of the blower housing 181 is held in tight contact with the cooperating stationary parts of the housing by means of a pair of adjustable clamps 211. Air is admitted to the housing through suitable openings 213 formed in the rear vertical frame element 25 as illustrated in Fig. 7.

The moving parts of the combination cutter and blower mechanism are supported upon the main plate member 175 which is cut from a square piece of fairly heavy boiler plate. The vane members 177, a hub 215, which is keyed to the shaft 183, and four rectangularly shaped, reinforcing ribs 217 are integrally welded to the main plate 175. A hole 219 is punched in the hub end of each of the reinforcing ribs 217 and during the welding operation, the welding is extended to the hub 215 itself through these punched holes, as illustrated particularly in Fig. 8. This anchors the ribs 217 very firmly to the hub 215 and helps to stiffen the entire structure.

The knife assemblies 179 are mounted on the front face of the cutter wheel plate 175, and each includes a knife member 221 which is of generally rectangular shape and a pair of spaced, adjustable supports 223 for the knife. Small angle iron baffles or shields 225 are attached to the plate to fill in the spaces between the knives 221 and the face of the wheel plate 175. The shields 225 are particularly useful when the machine is handling stringy material, such as straw, in preventing such material from looping over the knives 221 or the knife supports 223 and building up so as to throw the cutter wheel out of balance.

In operation the cutting face of each of the knives 221 moves past a rectangularly shaped shear plate 227 which is supported on the frame 21 beneath the scraper 103 for the lower feed roll 89. The length of the shear plate 227 is approximately equal to the width of the opening 229 in the side portion 203 of the blower housing 181 through which the material to be cut is fed, the opening 229 being of the same width as the feed rolls 89 and 91 and the carrier 29. The knives 221 are a little longer than the shear plate 227.

The shear plate 227 is of hardened steel and is ground so as to provide four shearing edges. Since the plate is removably attached to the frame 21 by means of the bolts 105, it is a comparatively simple operation during the use of the machine to loosen this plate and turn it over to provide a new shearing edge. The provision of four sharp edges on the shear plate 227 is usually sufficient to make it unnecessary to resharpen the plate in the field, and since accurate grinding and adjustment of the shear plate is required in order to obtain proper operation of the knives 221, this is a very advantageous feature.

The shape of the plate member or cutter wheel 175 is also an important feature of the invention. Heretofore, it has been customary to use a circular disc cutter wheel having a circular outline. A wheel of this shape is both wasteful of material and difficult to cut. The cutter wheel 175, as illustrated in Fig. 7, is made from a square plate by a simple shearing operation, and has proven highly satisfactory in use.

A further modified cutter wheel is illustrated at 175a in Fig. 14. The cutter wheel 175a is made from an even smaller square of plate material than the wheel 175 illustrated in Fig. 7 and can be manufactured without any substantial waste of material at all. The entire combined blower and cutter wheel assembly illustrated in Fig. 14 is welded together and, except for the shape of the plate 175a, is similar to the blower and cutter wheel mechanism just described. For this reason, further description of the vanes 177a, the reinforcing ribs 217a, and the knife assemblies 179a, and the other structural elements forming a part thereof, is believed unnecessary.

The drive mechanism for the machine includes in addition to the main power take-off sprocket 197, a safety, jump clutch, a combination gear box and manually operable clutch 231 which makes possible two-speed forward or reverse operation of the crop feeding mechanism, and the necessary associated control means. The jump clutch 229 is interposed between the main power take-off sprocket 197 and the gear box and clutch 231. The complete mechanism is illustrated diagrammatically in Fig. 10 and somewhat more completely in Figs. 11 and 12.

The jump clutch 229 is of the standard spring operated type, and is so designed that it will slip or jump and prevent the transmission of power to the crop feeding mechanism in the event that the volume of material being fed exceeds the safe load limits of the machine. A rather loud snapping sound is produced when the clutch slips. During normal operation, the feeding rate is controlled so as to bring the volume of material being fed just underneath that which will cause the safety clutch 229 to slip. Minor overloads or transient heavy overloads will be taken care of by slight slipping of the clutch, and the operator will be warned to reduce the rate of feed to the hopper 31 by the snapping sound produced when the clutch slips. In the case of heavy overloads if this warning is not heeded by the operator and the loading of the machine decreased, the reaction forces produced by the clutch slippage will automatically effect the disengagement of the manually operated clutch constituting a part of the gear-clutch unit 231 and thereby disconnect the feeding mechanism, preventing damage to the machine.

As illustrated in Fig. 11, the jump clutch 229 includes a sprocket 233 which is connected to the power output sprocket 197 on the cutter wheel shaft 183 by a chain 235. The sprocket 233 is affixed to a plate 237 journalled on a hub 238 which is fixed on the main input shaft 239 for the gear box and clutch unit 231. The mechanical connection between the shaft 239 and the sprocket is provided by two notched, steel discs 241 and 243, one of which is integral with the hub 238 and the other of which is mechanically connected to the clutch sprocket 233 by means of three bolts 244 with springs 245 around them for urging the clutch members into driving engagement. The entire clutch mechanism is enclosed within a suitable dust cover 247. Slippage between the notched discs 241 and 243 is, of course, determined by the compression of the springs 245.

The gear box and clutch unit 231 includes an input shaft 239 and two output shafts 249 and 251. The output shaft 249 drives the supporting shaft 109 for the upper feed roll 91 and the intermediate and beater rolls 87 and 85 which are connected thereto through a short connecting shaft 253 and universal joint 255, which connects to the universal joint 119 on the shaft 109, as illustrated in Fig. 10. The other output shaft 251 connects directly to the drive shaft 93 for the lower feed roll 89 and the carrier 29 through the coupling 95. The two output shafts 249 and 251 are connected together for rotation in opposite directions by two gears 257 and 259.

The shaft 249 for the upper gear 257 is journaled in suitable bearings provided in a sub housing 261 bolted to the platform portion 23 of the frame 21. The shaft 251 for the lower gear 259 is journaled in bearings supported in the housing 263 of the gear box proper, as shown in Fig. 11. A rectangular opening 265 in the platform portion 23 of the frame 21 is provided to permit engagement of the two gears 257 and 259.

Two oppositely arranged beveled gears 267 are mounted on the input shaft 239 for free rotation relative thereto, and a suitable clutch member 269 is splined to the shaft 239 and adapted to be moved, by means of a suitable fork member 271, into and out of engagement with either of the beveled gears 267. The bevel gears 267 mesh with a cooperating beveled gear 273 keyed to a central shaft 275, which is provided at its other end with a double pinion spool 277 splined to the shaft 275, but movable therealong. The pinion spool 277 is used as the speed changing element, and is arranged to be moved along the shaft 275 into engagement with either of the two spaced gears which make up the cooperating spool gear 279 by a fork 281 which is in turn connected to a slidably supported operating member 283, which projects through the housing 263. The smaller gear element of the spool gear 279 permanently meshes with the lower drive gear 259 for the feeding mechanism, as illustrated particularly in Figs. 10 and 12.

The housing 263, and with it the gear box and clutch unit 231, is bolted in position beneath the horizontal platform portion 23 of the main frame 21, as illustrated particularly in Figs. 1, 5, and 12, and that portion of the frame thus serves as the cover plate for the gear housing 263. This is a useful feature of the invention. To provide lubrication for the gear elements the housing 263 should be filled with a suitable lubricant.

The clutch mechanism is normally operated by means of a U-shaped operating member 285 which is hingedly supported on the main frame 21 just ahead of the channel section 37. The operating member 285 is connected to the operating fork 271 for the clutch within the gear box by means of a suitable link member 287 and a rod 289 which connects with the slidable operating rod 291 for the clutch operating fork 271. The rod 289 is provided with three notches 293 for engaging a spring catch 295 which releasably holds the rod 289 and the operating member 285 in any one of the three possible positions. When the operating member 285 is vertical, the spring catch 295 is in the central position, and the feed mechanism is disconnected. Movement of the operating member 285 and the rod 289 rearwardly, that is in the direction of movement of material along the carrier 29, puts the feed mechanism into reverse, and movement of the same elements forwardly effects feeding operation of the feed mechanism. The operating member 285 projects over the sides of the hopper and can be easily reached for normal operation or in the event of accident.

When it is desired to put the machine into operation, as for example in the filling of the silo, the delivery pipe section 201 of the blower housing will be connected to a conveyor pipe of the usual type, and the drive pulley 195 will be connected to a suitable source of power by a belt or other means. To assist in holding the machine in place the draw bar 53 should be staked down, and the chain 297 which is fastened to the frame 21, as illustrated particularly in Fig. 8, should be affixed to a rigid support so as to aid in balancing the belt pull. Then, with the operating member 285 for the carrier feeding means in the vertical or inoperative position, power may be applied to the belt pulley. This will start the blower and cutter wheel 175 and after it has been determined that the various parts of the mechanism are in proper order, the carrier 29 may be put into operation by moving the operating member 285 toward the front or hopper end of the machine. The crop to be cut will then be fed onto the carrier 29 at a proper rate as previously described, whereupon the cutting of the crop and delivery of the same to the silo or other receptacle will take place automatically.

As previously described, the provision of the combination of the beater roll 85, intermediate feed roll 87, and a pair of squeeze type feed rolls 89 and 91 makes possible the use of a large hopper into which bundles can be pitched from high loads and on windy days and is of great value in accomplishing the improved operation of the machine of the present invention. The supporting of the beater roll 85 in such manner that it is movable independently of the intermediate roll 87 and the squeeze type feed rolls 89 and 91, and the supporting of the intermediate roll 87 so as to permit a limited amount of independent movement relative to the squeeze type feed rolls, while at the same time producing simultaneous movement of the intermediate and upper feed rolls in the event of the sudden passage of a large amount of material through the machine are also important features of the invention. The particular bearing suspension for the cutter wheel 179 which is disclosed and the all welded construction of that wheel itself are very useful features, the central bearing 187 being supported on the most rigid portion of the frame 21 effectively withstanding the shock stresses resulting from the knife action and the easily adjustable outboard bearings 185 and 189 make possible a minimum of vibration.

Under normal operating conditions and when handling most feed crops, lengths of cut of from about one-quarter to three quarters of an inch are sufficient. In the machine of our invention the rate of feeding can be readily adjusted relative to the speed of the cutter and blower wheel to obtain this range of cuts. When the smaller unit of the power take-off sprocket 197 is used as the driving unit cuts of one-quarter and one-half inch can be obtained by operation of the gear box unit 231 in the low and high speed positions respectively. Changing to the larger unit of the double sprocket 197 provides cuts of three-eighths inch and three-fourths inch. The gear box unit 231 is moved to its two positions by operation of the speed changing rod 283. The slow speed position is shown in Fig. 11. In the high speed position the larger gear of the pinion spool 277 will mesh with the smaller of the two gears making up the spool gear 279. Notches 299 provided in the operating rod 283 and a suitable locking member 301 permit the convenient operation of this speed changing means.

Under some conditions and for certain crops, this one quarter to three quarter inch range for the length of cut is not sufficient. Longer cuts can be obtained by removing two of the opposed knives 221 from the cutter wheel 279 and operating the machine with only two knives. This will, of course, double the length of cut which is obtained when using the four knives. In extreme cases, where a very long cut is desired the machine may be operated with only one knife, a counter balance being bolted in place of the other knife.

Figures 15, 17:
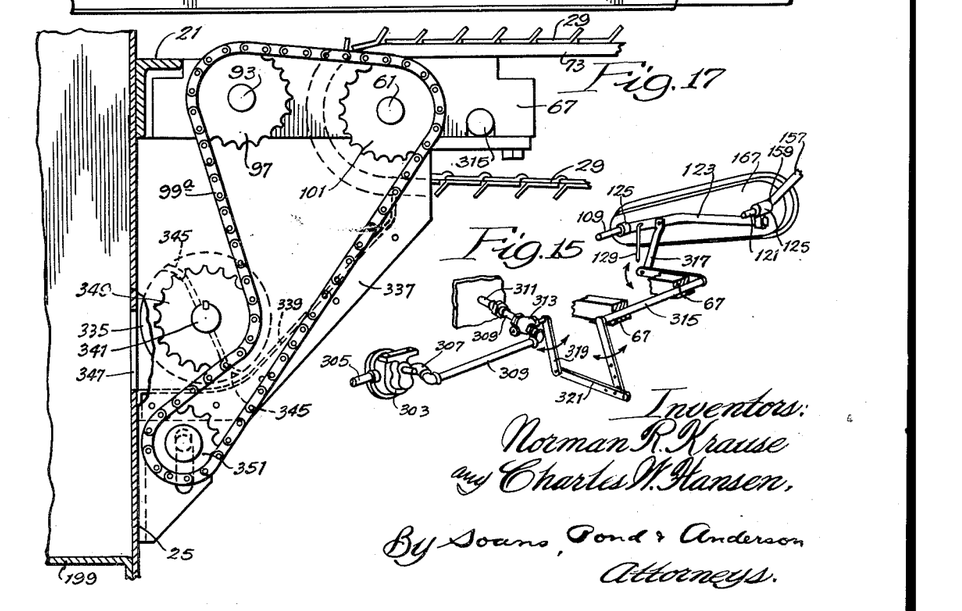
Fig. 15 is a diagrammatic perspective view showing the control means for the molasses or water pump embodied into the machine of Fig. 1.
Figs. 16 and 17 are respectively, front and side elevational views of a chaff auger attachment for use in connection with the machine in Fig. 1.

It is often desirable to add molasses, water or other liquids to the feed during the cutting operation, and to make this possible the machine includes a molasses feed pump 303 and a control means for regulating the delivery from the pump in proportion to the rate of feed. The pump 303 is supported upon the main frame 21 of the machine and, as shown particularly in Fig. 17, is provided with an inlet pipe 305 and an outlet 307 which is connected by a suitable piping 309 to a nipple 311 which extends through an opening in the blower housing casing. A metering valve 313 is interposed in the piping 309 and the pump is of such standard design that any excess liquid pumped therethrough is by-passed within the pump without the creation of excess pressures.

The metering valve 313 is controlled by an adjustable linkage which is operable to open the metering valve proportional to the separation of the squeeze type feed rolls 89 and 91. This linkage includes a double, offset crank member 315 which is journaled in the bearing blocks 67 and is connected to the right hand link 123 adjacent the supporting shaft 109 for the upper, squeeze type feed roll 91 by a link 317 and is operatively connected to the metering valve 313 by a lever 319 and a link 321. Adjustment of the rate of liquid feed may be accomplished by adjustment of the left hand element of the crank 315 relative to the link 321.

The molasses pump 303 is driven by a sprocket 323 and chain 325 which engages a sprocket 327 supported on the forward end of the gear box input shaft 239. Since the operation of the molasses pump 303 is frequently of an intermittent nature, the sprocket 327 is supported so that it may rotate freely on the end of the shaft 239 except when it is locked thereto by suitable means such as the keying member 329 illustrated in Fig. 13. As will be seen by reference to that figure, when it is desired to operate the molasses pump, the keying member 329 will be fastened in place so that the hexagonal head portion thereof will engage the hexagonal recess 331 in the hub of the sprocket wheel 327 and the squared side portions 332 thereof will engage the cooperating portions 333 on the shaft 239. When it is desired to declutch the pump 303 the locking member will be turned end for end.

Figure 16:
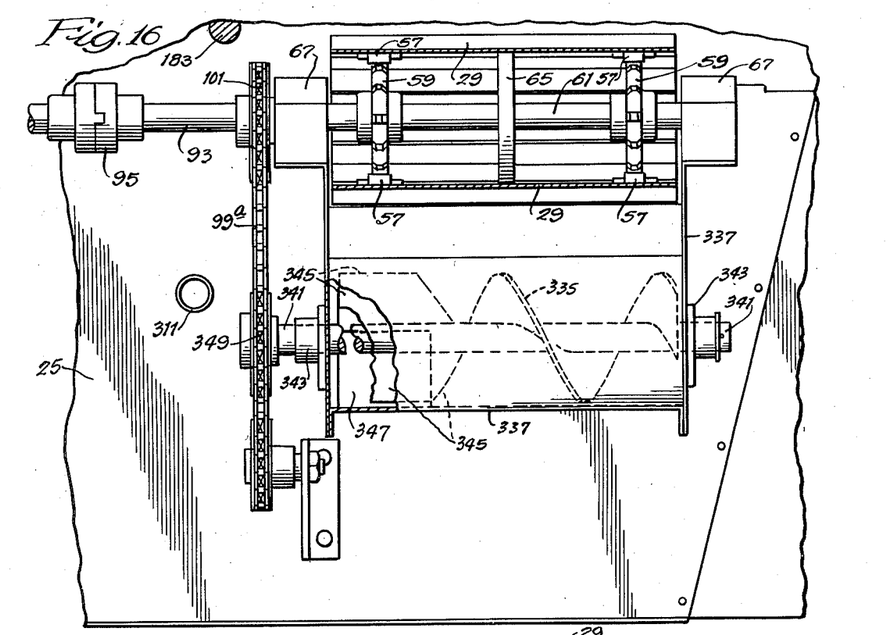

Under some conditions a considerable amount of chaff will be produced at the read end of the carrier or feed rake 29 and underneath the cooperating squeeze type feed rolls 89 and 91. To prevent waste of this chaff, the machine may be equipped with a chaff auger mechanism, as illustrated in Figs. 16 and 17. This mechanism includes a rotatable auger 335 and a hopper 337 which fits up against the adjacent side 25 of the blower housing. The hopper 337 is of sufficient dimensions at its top to receive the chaff liberated. The bottom 339 of the hopper is inclined downwardly and rearwardly toward the blower housing and the auger is supported on the sides of the hopper by a suitable shaft 341 and bearing 343, as illustrated. The left hand end of the auger 335 terminates in paddle portions 345 and an opening 347 is provided in the blower housing through which the paddles 345 may push the chaff or other material conveyed by the auger 335 into the blower housing for incorporation into the other material being delivered by the blower. The auger 335 is driven by means of a sprocket 349 which is connected to the drive sprockets 97 for the lower feed roll 89 and the drive sprocket 101 for the carrier by a chain 99a. This chain is similar to the chain 99 used in the previously described embodiment of the machine which does not incorporate the chaff auger mechanism except for its increased length. It is desirable that a chain tensioning means such as the adjustably supported sprocket 351 be provided in a construction of this type.

Figure 18:
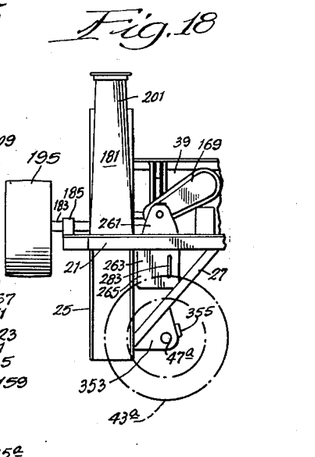
Fig. 18 is a fragmentary view of a modified rear wheel support arrangement that can be used in the machine of the present invention.

The tricycle wheel support arrangement described above is an important feature of the invention. It permits convenient transport of the machine at high speed by the use of only two rubber tires. At the same time the machine may be easily moved short distances on all three wheels by the machine operator without assistance, and the trail or draw bar 53 provides a convenient means for anchoring the machine during use thereof. In certain instances these advantages will be further augmented by location of the two main support wheels 43 in a more forwardly position, as illustrated in Fig. 18.

In the structure illustrated in that figure, which is otherwise similar to the machine described above, the wheel support spindles 47a are supported by rigid plate members 353 welded to the struts 27. Crosswise stiffening ties 355 for the plates 353 may be provided if required. When the main support wheels, indicated in outline at 43a, are supported on the spindles 47a the center of gravity of the machine is moved rearwardly of the main support axis. This is particularly advantageous when the machine is to be transported over substantial distances at frequent intervals, since it lowers the weight on the draw bar 53. Also it moves the wheels from the path of the belt, allowing greater freedom in the location of the driving unit.

In the foregoing we have described the features of an improved feed cutter which, by virtue of the novel structural features and combinations embodied therein, operates more easily and more satisfactorily than the structures heretofore known to the art. Various modifications of these features and structural combinations will be apparent to those skilled in the art. Accordingly, it is our desire that the accompanying claims shall receive the broadest possible construction consistent with the language appearing therein.

We claim:

1. In a crop cutting machine of the class described, a unitary frame structure including a horizontally extending platform, a blower casing the lower half of which depends from and is integrally secured to said platform, a crop conveying and feeding mechanism, which includes a hopper and a movable conveying means disposed in the bottom of said hopper, supported at one end on said frame, said platform having a large opening at one side thereof for receiving the delivery end of said conveying and feeding mechanism, a channel member having its flanges downwardly disposed, secured to said frame in front of said opening and level with said platform, a pair of upstanding, spaced apart, strength imparting, side plates having outwardly flared front portions, bridging said opening in said platform, and connecting with said hopper to form a continuation thereof, the bottom edges of said plates being secured to said platform at the sides of said opening therein and being also secured to the top of said channel member, a tubular beam which extends longitudinally of said machine and which is integrally attached to both flanges of said channel member, said beam serving as the main longitudinal support for said conveying and feeding mechanism and a plurality of horizontally extending, conveyor support members supported by welding at spaced apart intervals on said beam and extending crosswise thereof.

2. In a crop cutting machine of the class described, a main frame, a blower housing integrally attached to said main frame, an elongated sub frame attached at one end to said main frame, a conveyor supported on said sub frame, a pair of main support wheels mounted on said main frame at opposite sides of said blower housing, a third support wheel located adjacent the front end of said machine, means including a vertically depending fork for mounting said third support wheel on said sub frame in such manner that said wheel may be turned about a vertical axis, a draw bar hingedly secured to said fork, said draw bar being adapted to be swung to one side and anchored to the ground when said machine is in operation, and a draw bar locking member hingedly supported on said sub frame and movable from a normal inoperative position into a draw bar engaging position in which position said draw bar is held against upward and sidewise movement whereby elevation of said draw bar will raise the front end of said machine to provide for the convenient transport thereof on said two main support wheels.

3. In a crop cutting machine of the class described, a main frame, a blower housing integrally attached to said main frame, a cutter and blower wheel mounted on said main frame for rotation within said blower housing, an elongated sub frame attached at its rear end to said main frame, a conveyor supported on said sub frame, a pair of main support wheels mounted on said main frame at opposite sides of said blower housing and forwardly of the plane of rotation of said blower and cutter wheel, a third support wheel located adjacent the front end of said machine, means including a vertically depending fork for mounting said third support wheel on said sub frame in such manner that said wheel may be turned about a vertical axis, a draw bar hingedly secured to said fork, and a draw bar locking member hingedly supported on said sub frame and movable from a normal inoperative position into a draw bar engaging position in which position said draw bar is held against upward and sidewise movement whereby the elevation of said draw bar will raise the front end of said machine to provide for the convenient transport of said machine on said two main support wheels.

4. A unitary, all welded, cutter and blower wheel structure for use in a crop cutting machine of the class described comprising, a square plate member, a hub welded to said plate member centrally thereof and at right angles to the plane of said plate member, a plurality of elongated, rectangularly shaped, reinforcing ribs welded to one side of said plate member and to said hub, each of said ribs having an inner end portion disposed in face to face contact with said hub and said inner end portion having a hole formed therein so as to permit the ribs to be welded around said hole to said hub, four, equally spaced, vane members welded onto said plate member adjacent the corners thereof, each of said vane members extending in a generally radial direction, a plurality of knife members, means including a pair of adjustable support members for supporting each of said knives on said plate member, and a baffle located between each pair of said support members for preventing the accumulation of material thereon.

5. In a crop cutting machine of the class described, a unitary, main frame structure which includes a blower housing provided with a crop receiving opening and a cut crop discharge opening, a combination blower and cutter wheel supported for rotation within said blower housing, means for rotating said blower and cutter wheel, and means for feeding the crop material to be cut into said housing, said crop feeding means including an elongated hopper which extends longitudinally of said machine, a conveyor which is disposed in the bottom of said hopper and which is operable to move the crop material to be cut along said hopper into the proximity of said crop receiving opening, a pair of vertically arranged, squeeze type, feed rolls located adjacent said crop receiving opening, means supporting said squeeze type feed rolls so as to permit movement of one of said rolls toward and from the other thereof, means for directing the material delivered by said conveyor into said squeeze type feed rolls including a beater roll, means supporting said beater roll above said conveyor and forwardly of the discharge end thereof, an intermediate feed roll, means supporting said feed roll between said beater roll and said squeeze type feed rolls, said beater roll being supported so as to be vertically movable independently of said intermediate and said squeeze type feed rolls, said intermediate roll being supported so as to be capable of limited independent movement relative to said squeeze type feed rolls, and means for driving said conveyor and said feed rolls at speeds which are proportional to the speed of rotation of said cutter and blower wheel.

6. In a crop cutting machine of the class described, a unitary, main frame structure including a horizontally extending platform and a blower housing which is provided with a crop receiving opening and a cut crop discharge opening, a combination blower and cutter wheel supported for rotation within said blower housing, means for rotating said blower and cutter wheel, and means for feeding the crop material to be cut into said housing including an elongated hopper which extends longitudinally of said machine, an endless conveyor having its upper run disposed in the bottom of said hopper and being operable to move the crop material to be cut along said hopper into the proximity of said crop receiving opening, a pair of vertically arranged squeeze type feed rolls located adjacent said crop receiving opening, means supporting said squeeze type rolls for cooperative rotative movement, said support means permitting the upper of said rolls to move vertically relative to the lower of said rolls, means for directing the material delivered by said endless conveyor into said squeeze type feed rolls including a beater roll, means supporting said beater roll above said conveyor and forwardly of the discharge end thereof, an intermediate feed roll and means supporting said intermediate feed roll between said beater roll and said squeeze type feed rolls, the support means for said beater roll permitting that roll to float on the material being moved by said conveyor independently of the position of the other rolls, and means for driving said conveyor and said feed rolls at speeds which are proportional to the speed of rotation of said cutter and blower wheel, said last mentioned means including a gear type speed changing mechanism which is mounted on the platform portion of said frame and which is operable to change the relative speed of said gear and cutter wheel and said crop feeding means whereby differing lengths of cut may be obtained.

7. A crop conveying mechanism for use in conjunction with a crop cutting machine of the class described, comprising an elongated hopper, an endless conveyor the upper run of which is arranged for movement along the bottom of said hopper, a plurality of feed rolls which cooperate with said hopper and said conveyor, said feed rolls including a pair of squeeze type rolls disposed adjacent the delivery end of said conveyor, a beater roll positioned above said conveyor forwardly of the delivery end thereof, and an intermediate feed roll disposed between said beater roll and said squeeze type feed rolls, means for supporting said rolls for free rotatable movement, means for driving said rolls at peripheral speeds which are proportional to the speed of said endless conveyor, said support means permitting free floating movement of said beater roll and being so arranged that upward movement of said intermediate roll beyond a predetermined point causes relative separation of said squeeze type feed rolls.

8. A crop conveying mechanism for use in conjunction with a crop cutting machine of the class described, comprising, an elongated hopper which is open at the inlet end and at the top thereof, and which has outwardly flaring side portions and an inwardly flaring section at the delivery end, an endless conveyor arranged for movement along the bottom of said hopper, said conveyor having a less width than the width of said hopper and a plurality of feed rolls which cooperate with said hopper and said conveyor, said feed rolls including a pair of vertically arranged, squeeze type rolls disposed adjacent the delivery end of said conveyor, a square beater roll of substantially the same width as said conveyor positioned above said conveyor forwardly of the delivery end thereof, and an intermediate feed roll positioned between said beater roll and said squeeze type feed rolls, bearing means supporting said rolls for free rotatable movement, guide support means for said squeeze type feed rolls which permits the upper of said rolls to move vertically relative to the other, link means mechanically interconnecting the bearing support means for said intermediate feed roll and said upper squeeze type feed roll, said link means permitting a limited amount of independent movement of said upper squeeze type feed roll and said intermediate roll and being so arranged that considerable upward movement of said intermediate roll results in a corresponding movement of said upper squeeze type feed roll, and link means interconnecting the bearing support means for said intermediate feed roll and said beater roll which permits free floating movement of said beater roll.

9. In a crop cutting machine of the class described, a unitary, main frame structure which includes a blower housing provided with a crop receiving opening and a crop discharge opening, a combination blower and cutter wheel supported for rotation within said housing, means for rotating said blower and cutter wheel, and means for feeding the crop to be cut into said housing through said crop receiving opening, said crop feeding means including an elongated hopper which extends longitudinally of said machine, a conveyor which is disposed in the bottom of said hopper and which is operable to move the crop material to be cut along said hopper into the proximity of said crop receiving opening, a pair of vertically arranged, squeeze type rolls located adjacent said crop receiving opening, means supporting said rolls so as to permit relative vertical movement thereof, means for directing the material delivered by said conveyor into said squeeze type feed rolls including a beater roll, means supporting said beater roll above said conveyor and forwardly of the discharge end thereof, an intermediate feed roll, and means supporting said intermediate feed roll between said beater roll and said squeeze type feed rolls, means for driving said conveyor and said feed rolls at speeds which are proportional to the speed of rotation of said cutter and blower wheel, and means for delivering liquid into the interior of said housing in amounts proportional to the separation of said squeeze type feed rolls, said last mentioned means including a pump, a metering valve, and a system of linkages extending between said metering valve and said squeeze type feed rolls.

10. In a crop cutting machine of the class described, a unitary, main frame structure which includes a horizontally extending platform and a blower housing provided with a crop receiving opening and a crop discharge opening, a combination blower and cutter wheel which is provided with a plurality of spaced knives supported on one face thereof, means for supporting said blower and cutter wheel for rotation within said blower housing, means for rotating said blower and cutter wheel, means for feeding the crop to be cut into said housing through said crop receiving opening, and a rectangularly shaped shear plate supported on said main frame adjacent the crop receiving opening in said housing for cooperating with the knives forming a part of said blower and cutter wheel, all four of the edges of said shear plate being cutting edges and said plate being removable to permit each edge to be used in turn, said frame including a reinforcing member extending crosswise thereof and adapted to rigidly support said shear plate.

11. In a crop cutting machine of the class described, a unitary, main frame structure which includes a horizontally extending platform and a blower housing provided with a crop receiving opening and a crop discharge opening, a combination blower and cutter wheel having a plurality of spaced knives supported upon one face thereof, means supporting said wheel for rotation within said blower housing, means for rotating said blower and cutter wheel and means for feeding the crop to be cut into said housing through said crop receiving opening, said crop feeding means including an elongated hopper having its discharge end adjacent said crop receiving opening and a pair of vertically arranged, squeeze type rolls located adjacent said crop receiving opening, the lower of said rolls having a smooth surface, said frame structure including a relatively rigid frame element extending crosswise thereof adjacent said crop receiving opening, a rectangular shear plate having four of its edges adapted to successively cooperate with said cutter knives, said shear plate being mounted on said cross member, and a stripper plate overlying said shear plate and also supported on said frame element for stripping material from said lower feed roll.

12. In a crop cutting machine of the class described, a unitary main frame structure including a horizontally extending platform, combination cutter and blower mechanism including a blower casing the lower half of which depends from and is integrally secured to said platform, a crop conveying and feeding mechanism which includes a hopper, and endless conveyor having its upper run disposed in the bottom of said hopper, and a sub frame supported at one end on said main frame, said platform having a large opening at one side thereof for receiving the delivery end of said conveyor, and a pair of upstanding, spaced apart, strength imparting, side plates having outwardly flared front portions, bridging said opening in said platform, and connecting with said hopper to form a continuation thereof, the bottom edges of said plates being secured to said platform at the sides of said opening therein and being also secured to said sub frame, said sub frame including a longitudinally extending, tubular beam positioned between the upper and lower runs of said conveyor and centrally of the width thereof and a plurality of transversely extending, conveyor support members affixed to said beam at spaced intervals therealong.

13. In a crop cutting machine of the class described, a main frame, combination cutter and blower mechanism supported on said main frame, a pair of main support wheels mounted on said main frame, a crop conveying and feeding mechanism for cooperating with said cutter and blower mechanism, said crop conveying and feeding mechanism including a hopper, an endless conveyor having its upper run disposed in the bottom of said hopper, and a sub frame which is attached at one end to said main frame and which includes a longitudinally extending, tubular beam positioned between the upper and lower runs of said conveyor and centrally of the width thereof, and a plurality of transversely extending, conveyor support members affixed to said beam at spaced intervals therealong, a third support wheel for said machine, and means for mounting said third wheel on said sub frame in such manner that it may be turned about a vertical axis, said last mentioned means including a yoke which encompasses the lower run of said conveyor and which is fastened at its ends to the ends of one of said sub frame cross members.

14. In a machine of the class described, a unitary, main frame structure which includes a blower housing provided with a crop receiving opening and a crop discharge opening, a combination blower and cutter wheel supported for rotation within said blower housing, means for rotating said blower and cutter wheel, and means for feeding the crop material to be cut into said housing, said crop feeding means including an elongated hopper which extends longitudinally of said machine, an endless conveyor which is disposed in the bottom of said hopper for moving the crop material therealong, and a plurality of feed rolls for directing the crop material moved by said conveyor into said crop receiving opening, and chaff salvaging means located adjacent the delivery end of said conveyor, said chaff salvaging means including a hopper for collecting material which falls from said conveyor and cooperating rolls, said hopper having a sloping bottom and communicating with said blower housing through an opening provided therein, and a power driven auger for moving material collected in said hopper into said blower housing through said communicating opening.

15. In a crop cutting machine of the class described, a unitary, main frame structure including a horizontally extending platform and a blower housing which is provided with a crop receiving opening and a cut crop discharge opening, a combination blower and cutter wheel supported for rotation within said blower housing, means for rotating said blower and cutter wheel, and means for feeding the crop material to be cut into said housing including an elongated hopper which extends longitudinally of said machine, an endless conveyor having its upper run disposed in the bottom of said hopper and being operable to move the crop material to be cut along said hopper into the proximity of said crop receiving opening, a pair of vertically arranged squeeze type feed rolls located adjacent said crop receiving opening, means supporting said squeeze type rolls for cooperative rotative movement, said support means permitting the upper of said rolls to move vertically relative to the lower of said rolls, means for directing the material delivered by said endless conveyor into said squeeze type feed rolls including a beater roll, means supporting said beater roll above said conveyor and forwardly of the discharge end thereof, an intermediate feed roll and means supporting said intermediate feed roll between said beater roll and said squeeze type feed rolls, the support means for said beater roll permitting that roll to float on the material being moved by said conveyor independently of the position of the other rolls, said support means for said upper roll and said intermediate roll being arranged to permit upward movement of said upper and intermediate rolls as a unit relative to said lower roll and said conveyor, and the support means for said intermediate roll also permitting upward movement of said intermediate roll independently of said upper roll in all positions thereof.

16. In a crop cutting machine of the class described, a unitary, main frame structure which includes a horizontally extending platform and a blower housing provided with a crop receiving opening and a crop discharge opening, a combination blower and cutter wheel having a plurality of spaced knives supported upon one face thereof, means supporting said wheel for rotation within said blower housing, means for rotating said blower and cutter wheel and means for feeding the crop to be cut into said housing through said crop receiving opening, said crop feeding means including an elongated hopper having its discharge end adjacent said crop receiving opening and a pair of vertically arranged, squeeze type rolls located adjacent said crop receiving opening, the lower of said rolls having a smooth surface, said frame structure including a relatively rigid frame element extending crosswise thereof adjacent said crop receiving opening, a shear plate having a cutting edge adapted to cooperate with said cutter knife, said shear plate being mounted on said cross member, and a stripper plate overlying said shear plate and also supported on said frame element for stripping material from said lower feed roll.

17. In a crop cutting machine of the class described, a main frame, a blower housing integrally attached to said main frame, an elongated sub-frame attached at its rear end to said main frame, a conveyor supported on said sub-frame, a pair of main support wheels mounted on said main frame at opposite sides of said blower housing, a third support wheel, means mounting said third wheel on said sub-frame adjacent its front end for pivotal movement about a vertical axis, a draw bar attached to said means for pivotal motion about a horizontal axis, whereby said draw bar is adapted to be swung to sidewise extending position for anchoring the front end of the machine, and means for locking said draw bar in fixed, forwardly extending relation to said sub-frame whereby elevation of said draw bar will raise the front end of the machine to permit transport thereof on said main support wheels.

NORMAN R. KRAUSE.
CHARLES W. HANSEN.